United States Patent
Lee et al.

(10) Patent No.: US 8,213,362 B2
(45) Date of Patent: Jul. 3, 2012

(54) METHOD AND SYSTEM FOR A NODE TO JOIN A WIRELESS AD-HOC NETWORK

(75) Inventors: Yueh-Feng Lee, Taipei (TW);
Chun-Hao Peng, Hsinchu (TW);
Yu-Wei Su, Taipei County (TW);
Hsin-Sheng Liu, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 460 days.

(21) Appl. No.: 12/490,322

(22) Filed: Jun. 24, 2009

(65) Prior Publication Data

US 2010/0150063 A1  Jun. 17, 2010

(30) Foreign Application Priority Data

Dec. 15, 2008  (TW) .............................. 97148831 A

(51) Int. Cl.
*H04W 84/18* (2009.01)
(52) U.S. Cl. ................... 370/328; 370/338; 379/201.02; 709/227; 455/435.1
(58) Field of Classification Search .................. None
See application file for complete search history.

(56) References Cited

U.S. PATENT DOCUMENTS

| | | | |
|---|---|---|---|
| 7,085,292 B1 | 8/2006 | Grayson | 370/475 |
| 7,219,141 B2 | 5/2007 | Bonasia et al. | 709/220 |
| 2003/0100343 A1* | 5/2003 | Zourntos et al. | 455/562 |
| 2007/0184837 A1* | 8/2007 | Hohl et al. | 455/435.1 |
| 2008/0172491 A1* | 7/2008 | Chhabra et al. | 709/227 |
| 2008/0292080 A1* | 11/2008 | Quon et al. | 379/201.02 |
| 2010/0203834 A1* | 8/2010 | Bragagnini et al. | 455/41.2 |

FOREIGN PATENT DOCUMENTS

| | | |
|---|---|---|
| JP | 2001-274802 | 10/2001 |
| JP | 2003-134131 | 5/2003 |
| JP | 2004-088389 | 3/2004 |
| JP | 2007523551 | 8/2007 |
| TW | 200822628 | 5/2008 |

OTHER PUBLICATIONS

"Office Action of Japan Counterpart Application", issued on Nov. 22, 2011, p. 1-p. 2.
"Office Action of Japan Counterpart Application", issued on May 8, 2012, p1-p2, in which the listed references were cited.

* cited by examiner

*Primary Examiner* — Chi H. Pham
*Assistant Examiner* — Shick Hom
(74) *Attorney, Agent, or Firm* — Jianq Chyun IP Office

(57) ABSTRACT

A method for a new node to join an ad-hoc network is provided. The method includes two basic functions. When the new node is allowed to join the network, the indicating device of the node being joined generates an indication. When the new node joins the network, the indicating device of the new node also generates an indication. The method further includes two commands, the join-rejection command and the joined-rejection command, to cancel the join procedure when the indicating device of the new node and the node being joined do not indicate correspondingly. Accordingly, the method efficiently reduces the possibility of joining an unanticipated node.

27 Claims, 9 Drawing Sheets

METHOD AND SYSTEM FOR A NODE TO JOIN A WIRELESS AD-HOC NETWORK

CROSS-REFERENCE TO RELATED APPLICATION

This application claims the priority benefit of Taiwan application serial no. 97148831, filed on Dec. 15, 2008. The entirety of the above-mentioned patent application is hereby incorporated by reference herein and made a part of specification.

BACKGROUND OF THE INVENTION

1. Field of the Invention

The disclosure relates to a method and a system for a node to join a wireless ad-hoc network.

2. Description of Related Art

Along with the development of wireless network technologies, wireless network has been broadly deployed. For example, the wireless devices in a company or a family can form a personal area network (PAN) so that data can be transmitted within the company or the family via the PAN. Taking the ZigBee standard as an example, 26 wireless channels are specified in this standard, and nodes on each of the channels can coexist without interfering each other. Besides, such a low-power wireless network equipment (i.e., a wireless node) has very simple structure and can be deployed conveniently. Nowadays, many people setup their own private wireless ad-hoc networks based on the ZigBee standard to accomplish home automation, office automation, and wireless sensing, etc When adding a new node to an existing wireless ad-hoc network, the most important step is the join process. Because data is transmitted between the nodes in a wireless manner, an unanticipated node may join the wireless ad-hoc network, or a node may join an unanticipated wireless ad-hoc network. As a result, private data may leak, and the bandwidth of the wireless ad-hoc network may taken up by unauthorized users.

In order to resolve the foregoing problem, a wired equivalent privacy (WEP) protocol has been developed for wireless devices based on the 802.11 standard, wherein unanticipated nodes are prevented from joining the network through authentication of WEP keys.

However, in the method mentioned above, each node requires an additional input interface to set the WEP key. Thus, this method is not suitable for ZigBee nodes which have simple structures. Thereby, a mechanism for resource constrained devices to prevent a node from mistakenly joining a wireless ad-hoc network is to be provided.

SUMMARY OF THE INVENTION

The disclosure relates to a method for a new node to join a wireless ad-hoc network, wherein an unanticipated node is prevented from joining a wireless ad-hoc network, and a node is prevented from joining an unanticipated wireless ad-hoc network.

In the present method, a permit-to-join command is invoked on an input unit of a target node to start a joined procedure of the target node, and a join request message is sent by the new node to start a join procedure of the new node. Next, a join response message is sent by the target node, and a joined prompt is issued on an indication unit of the target node, wherein the new node issues a join prompt in an indication unit thereof when the new node receives the join response message. Then, whether the joined prompt in the indication unit of the target node and the join prompt in the indication unit of the new node are correspondingly issued is determined, and if the joined prompt in the indication unit of the target node and the join prompt in the indication unit of the new node are not correspondingly issued, a reject-to-be-joined command is invoked on the input unit of the target node which issues the joined prompt to cancel the joined procedure of the target node, or a reject-to-join command is invoked on an input unit of the new node which issues the join prompt to cancel the join procedure of the new node.

The disclosure provides a method for a new node to join a wireless ad-hoc network. The method is suitable for connecting a new node among a plurality of candidate new nodes to a target node in a target wireless ad-hoc network, wherein the candidate new nodes and the target node respectively equipped with an input unit and an indication unit. The method includes a start step, a message receiving step, a prompt step, a determination step, a reject step, and a termination step. In the start step, a permit-to-join command is invoked from the input unit of the target node to start a joined procedure of the target node, and in the message receiving step, a join request message is received by the target node from one of the candidate new nodes during the joined procedure. In the prompt step, a join response message is sent from the target node which receives the join request message to the candidate new node during the joined procedure, and a joined prompt is issued on the indication unit of the target node, wherein when one of the candidate new nodes receives the join response message, the indication unit of this candidate new node issues a join prompt. In the determination step, whether the joined prompt of the target node and the join prompt of the new node are correspondingly issued during the prompt step is determined. In the reject step, a reject-to-be-joined command is invoked from the input unit of the target node if the joined prompt of the target node and the join prompt in the indication unit of the new node are not correspondingly issued during the determination step. Finally, in the termination step, the joined procedure is terminated.

The disclosure provides a method for a new node to join a wireless ad-hoc network. The method is suitable for connecting a new node to a target node among a plurality of candidate target nodes, wherein a joined procedure of the target node is already started, the new node and the candidate target nodes respectively equipped with an input unit and an indication unit, and the candidate target nodes may belong to different wireless networks. The method includes a request step, a prompt step, a determination step, and a reject step. In the request step, a join request message is sent from the new node to one of the candidate target nodes. In the prompt step, a join response message is received by the new node from the candidate target node which receives the join request message, and a join prompt is issued in the indication unit of the new node, wherein the candidate target node which issues the join response message issues a joined prompt in the indication unit thereof after it issues the join response message. In the determination step, whether the joined prompt in the indication unit of the target node and the join prompt in the indication unit of the new node are correspondingly issued is determined. In the reject step, a reject-to-join command is input in the input unit of the new node if the joined prompt in the indication unit of the target node and the join prompt in the indication unit of the new node are not correspondingly issued.

The disclosure provides a wireless ad-hoc network system suitable for a wireless ad-hoc network. The wireless ad-hoc network system includes a target node and a new node. The target node already joined a wireless ad-hoc network and equipped with a first input unit and a first indication unit, wherein the first input unit is used for receiving a permit-to-join command to start a joined procedure on the target node. The new node equipped with a second input unit and a second indication unit. The new node automatically sends a join request message to start a join procedure on the new node. When the target node sends a join response message, the first indication unit issues a joined prompt, and when the new node receives the join response message, the second indication unit issues a join prompt. In particular, if the joined prompt on the first indication unit and the join prompt on the second indication unit are not correspondingly issued during the joined procedure, the first input unit or the second input unit is further used for receiving a reject-to-be-joined command or a reject-to-join command to cancel the joined procedure on the target node or the join procedure on the new node.

In the disclosure, the input unit is adopted for starting the joined procedure and inputting the reject-to-join command, and the states of the target node and the new node are determined through the indication unit. Thereby, an unanticipated node can be effectively prevented from joining a wireless ad-hoc network.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
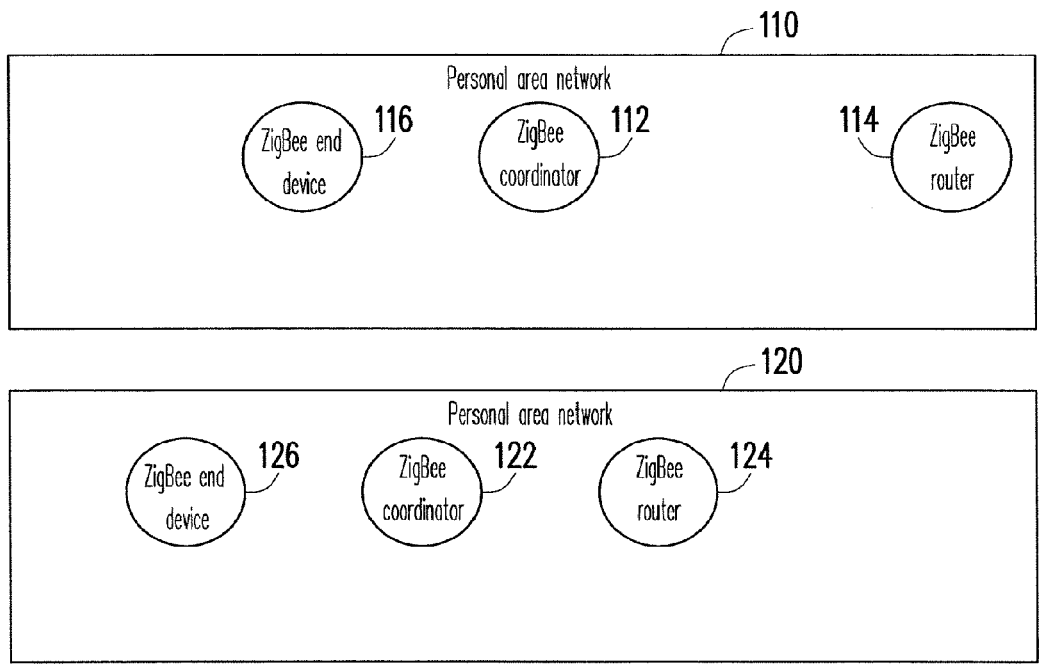
FIG. 1 is a diagram of a ZigBee network environment according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

For the convenience of description, a wireless ad-hoc network conforming to the ZigBee standard will be taken as an example in following descriptions. However, the disclosure is not limited thereto, and the method provided by the disclosure may be applied to wireless ad-hoc networks based on different wireless network standards.

FIG. 1 is a diagram of a ZigBee network environment according to an embodiment of the disclosure.

Referring to FIG. 1, a personal area network (PAN) 110 and a PAN 120 are in the network environment. The PAN 110 and the PAN 120 are both wireless ad-hoc networks conforming to the ZigBee standard.

The PAN 110 includes a plurality of nodes, namely, a ZigBee coordinator 112, a ZigBee router 114, and a ZigBee end device 116.

In the PAN 110, the ZigBee coordinator 112 is used for initializing the PAN 110. According to the ZigBee standard, each PAN conforming to ZigBee has only one ZigBee coordinator. Besides being installed with a sensor or an actuator, the ZigBee router 114 is further used for relaying (i.e., routing) messages, while the ZigBee end device 116 is only installed with a sensor or an actuator. Each PAN conforming to the ZigBee standard may have multiple ZigBee routers and ZigBee end devices. After the ZigBee coordinator 112 initializes the PAN 110, the ZigBee router 114 joins the PAN 110 by connecting to the ZigBee coordinator 112, and the ZigBee end device 116 joins the PAN 110 by connecting to the ZigBee coordinator 112 or the ZigBee router 114.

To be specific, a ZigBee coordinator can only be served as a target node which allows a ZigBee router or a ZigBee end device to join a PAN. A ZigBee router can be served either as a target node or as a new node. Namely, a ZigBee router can connect to a ZigBee coordinator to join a PAN, and besides, other ZigBee routers or ZigBee end devices can join the PAN through the ZigBee router which is already in the PAN. A ZigBee end device can only be served as a node which joins a PAN.

The operations of the ZigBee coordinator 112, the ZigBee router 114, and the ZigBee end device 116 should be understood by people skilled in the art according to the specification document of the ZigBee standard therefore will not be described herein.

Similarly, the PAN 120 includes a plurality of nodes, such as a ZigBee coordinator 122, a ZigBee router 124, and a ZigBee end device 126.

Figure 2:
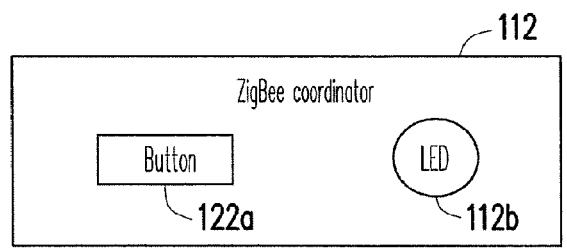
FIG. 2 is a diagram of an input unit and an indication unit of a node according to an embodiment of the disclosure.

In the present embodiment, the ZigBee coordinator 112, the ZigBee router 114, the ZigBee end device 116, the ZigBee coordinator 122, the ZigBee router 124, and the ZigBee end device 126 respectively have an input unit (for example, the input unit 112a illustrated in FIG. 2) and an indication unit (for example, the indication unit 112b illustrated in FIG. 2).

In the present embodiment, the input units of each of the ZigBee coordinator 112, the ZigBee router 114, the ZigBee end device 116, the ZigBee coordinator 122, the ZigBee router 124, and the ZigBee end device 126 is a button which may provides different commands according to different states and characteristics of the node. For example, the button of a ZigBee coordinator (or ZigBee router) can provide a permit-to-join command to start the join procedure of the ZigBee coordinator (or ZigBee router) when a join procedure of the ZigBee coordinator (or ZigBee router) has not been started, and the button of the ZigBee coordinator (or ZigBee router) can provide a reject-to-be-joined command to request the new node to leave the PAN when the ZigBee coordinator (or ZigBee router) is in a joining state. In addition, the button of a ZigBee end device (or a ZigBee router) can provide a reject-to-join command to request the ZigBee end device (or ZigBee router) to leave the PAN when the ZigBee end device (or ZigBee router) is in a joining state. In another embodiment of the disclosure, the input unit may also be a graphic user interface (GUI).

In the present embodiment, the indication unit of each of the ZigBee coordinator 112, the ZigBee router 114, the Zig- Bee end device 116, the ZigBee coordinator 122, the ZigBee router 124, and the ZigBee end device 126 are respectively a light emitting diode (LED) which may issue a joined prompt or a join prompt according to different states of the node. For example, when a node is connecting to a ZigBee coordinator (or ZigBee router), the LED of the ZigBee coordinator (or ZigBee router) flashes. In addition, when a ZigBee router (or ZigBee end device) is connecting to a node, the LED of the ZigBee router (or ZigBee end device) flashes. In another embodiment of the disclosure, the indication unit may also be a sound producing device.

Figure 3:
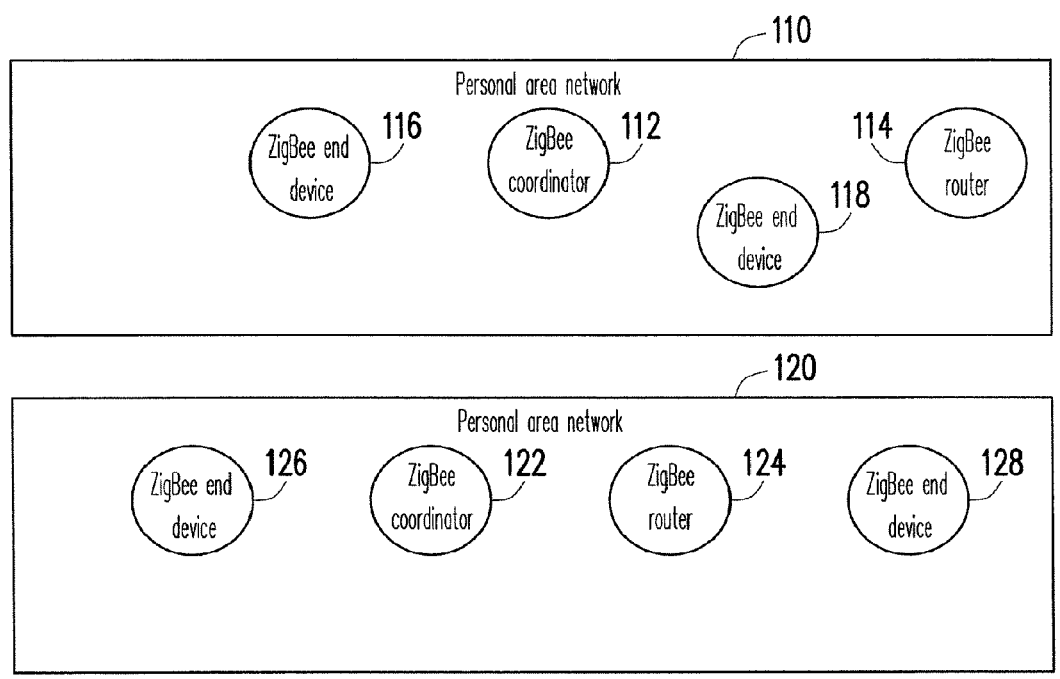
FIG. 3 is a diagram illustrating how a new node to join a personal area network (PAN) according to an embodiment of the disclosure.
Figure 4:
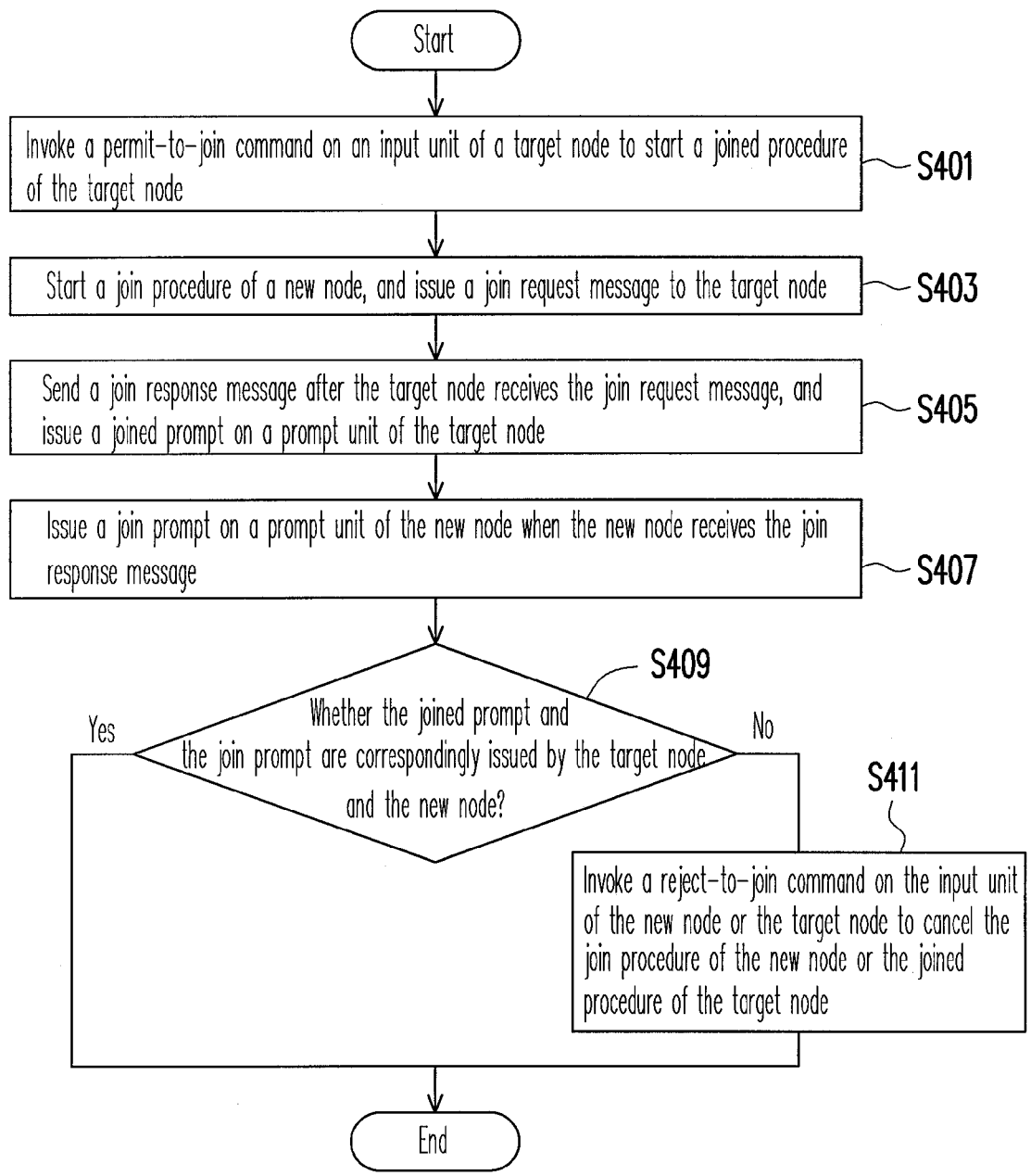
FIG. 4 is a flowchart illustrating how a new node to join a PAN according to an embodiment of the disclosure.

FIG. 3 is a diagram illustrating how a new node to join a PAN according to an embodiment of the disclosure, wherein the new nodes (i.e., the ZigBee end device 118 and the ZigBee end device 128) respectively join the PAN 110 and the PAN 120. FIG. 4 is a flowchart illustrating how a new node to join a PAN according to an embodiment of the disclosure. Below, how the ZigBee end device 118 is joined to the PAN 110 will be described with reference to FIG. 3 and FIG. 4.

Referring to FIG. 3 and FIG. 4, in order to join the new node (i.e., the ZigBee end device 118) to the PAN 110, in a start step, a permit-to-join command is invoked on the input unit of a target node to start a joined procedure on the target node (step S401). Since a ZigBee network is a low-power wireless network which only covers a small area, it is assumed in the present embodiment that the permit-to-join command is invoked on the input unit of the ZigBee router 114 which is closer to the ZigBee end device 118 to start the joined procedure. Namely, the ZigBee end device 118 is the new node. During this period, the ZigBee end device 118 gets to know that the ZigBee router 114 is in an allow-to-join state by issuing a beacon request message and receiving a beacon response message from the ZigBee router 114.

Then, in step S403, the ZigBee end device 118 automatically starts a join procedure of the new node and sends a join request message to the ZigBee router 114.

After that, the ZigBee router 114 executes a message receiving step. After receiving the join request message, the ZigBee router 114 sends a join response message and the indication unit of the ZigBee router 114 executes a prompt step to issue a joined prompt (for example, the LED of the ZigBee router 114 flashes) (step S405).

Thereafter, when the ZigBee end device 118 receivers the join response message, the indication unit of the ZigBee end device 118 executes a prompt step to issue a join prompt (for example, the LED of the ZigBee end device 118 flashes) (step S407).

In other words, the ZigBee end device 118 successfully connects to the ZigBee router 114 and joins the PAN 110 when the indication units of the ZigBee router 114 and the ZigBee end device 118 both issue a prompt.

In the embodiment described above, the ZigBee end device 118 correctly connects to the ZigBee router 114. However, in a network environment having multiple PANs, a new node may join a wrong PAN, or a target node may accept an unanticipated node. In an embodiment of the disclosure, when a new node is connected to a target node, the indication unit of the new node can provide the connection state between the new node and the target node. Taking the connection between the ZigBee router 114 and the ZigBee end device 118 as an example, if the indication units of the ZigBee router 114 and the ZigBee end device 118 both issue a prompt, it means the two nodes are connecting with each; if the indication unit of the ZigBee router 114 issues a prompt but the indication unit of the ZigBee end device 118 does not issue any prompt, it means the ZigBee router 114 is connecting with an unanticipated new node; and if the indication unit of the ZigBee router 114 does not issue any prompt but the indication unit of the ZigBee end device 118 issues a prompt, it means the ZigBee end device 118 is connecting to an unanticipated target node. Accordingly, a determination step is executed in the flowchart illustrated in FIG. 4, wherein whether the new node and the target node issue prompts correspondingly is determined (step S409). If the new node and the target node do not issue prompts correspondingly, in a reject step, a reject-to-join command or a reject-to-be-joined command is invoked on the input unit of the new node or the target node to cancel the join procedure (step S411).

As described above, in the wireless ad-hoc network (as shown in FIG. 3) of the present embodiment, the procedure for a new node to join the network can be carried out in both the PAN 110 and the PAN 120, and the new node can be prevented from joining an unanticipated PAN. Assuming that a network manager of the PAN 110 is about to join the ZigBee end device 118 to the PAN 110 and at the same time, a network manager of the PAN 120 is about to join the ZigBee end device 128 to the PAN 120, according to the disclosure, the ZigBee end device 118 is prevented from joining the PAN 120 and a node in the PAN 120 (for example, the ZigBee end device 128) is prevented from being connected by the ZigBee router 114. Below, the joined procedure of the ZigBee router 114 and the join procedure of the ZigBee end device 118 will be described in detail with reference to accompanying drawings.

Figure 5:
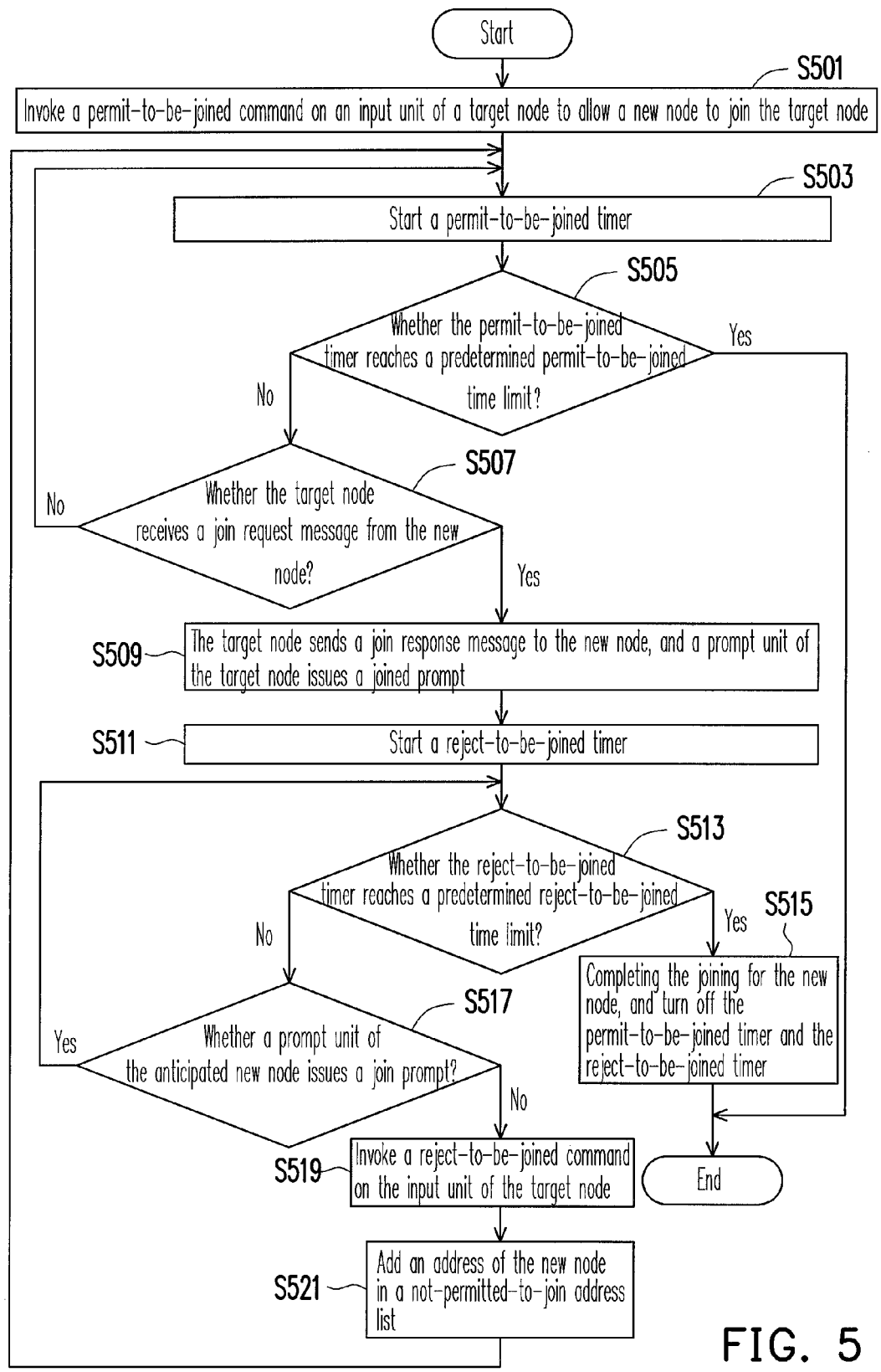
FIG. 5 is a flowchart of a joined procedure of a target node according to an embodiment of the disclosure.
Figure 6:
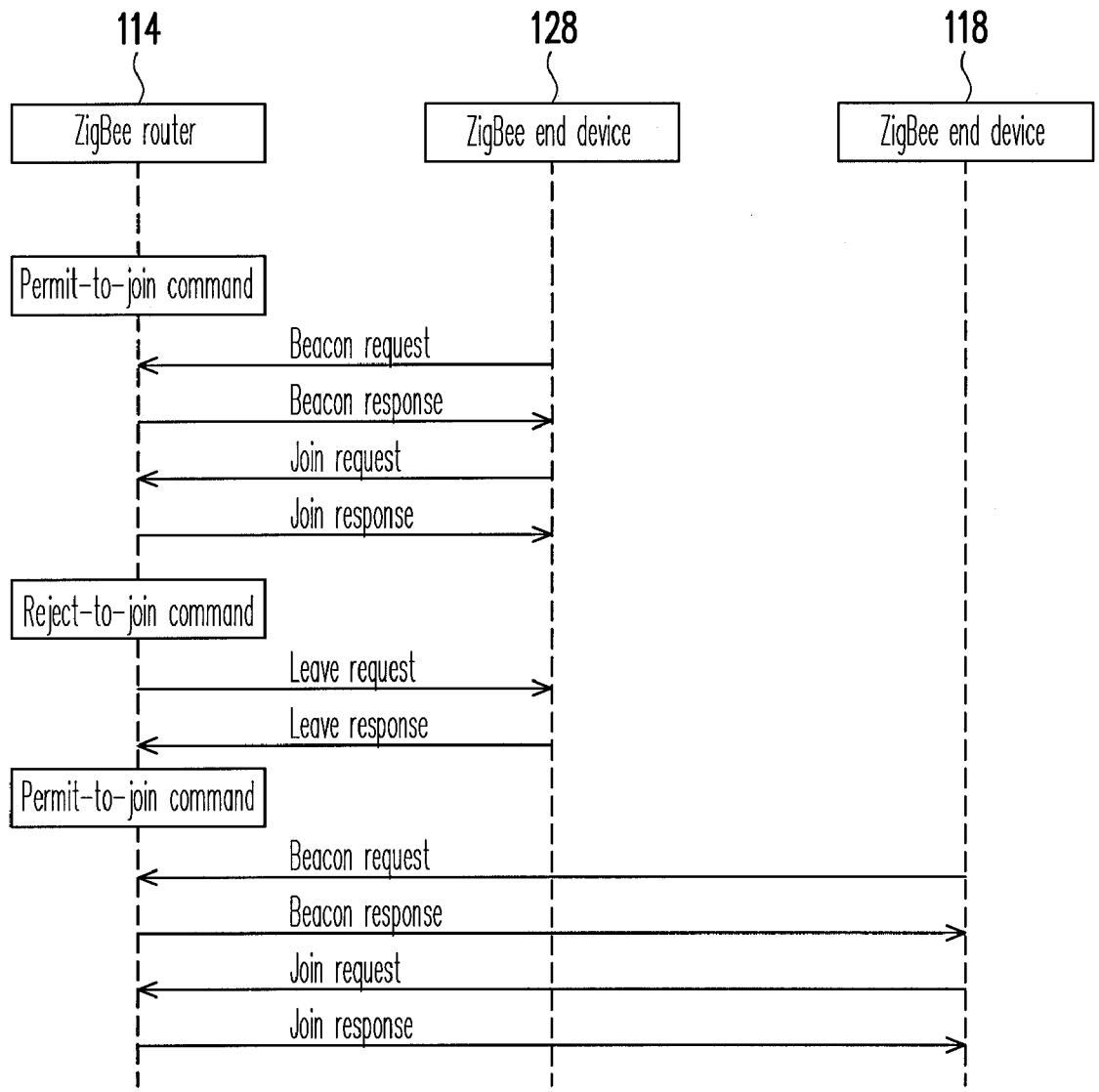
FIG. 6 is a diagram illustrating how a target node accepts a new node according to an embodiment of the disclosure.

FIG. 5 is a flowchart of a joined procedure of a target node according to an embodiment of the disclosure, and FIG. 6 is a diagram illustrating how a target node accepts a new node according to an embodiment of the disclosure. Below, the joined procedure of the ZigBee router 114 will be described as an example.

Referring to FIGS. 3, 5, and 6, assuming that the ZigBee router 114 is the closest target node to the new node (i.e., the ZigBee end device 118) in the PAN 110, in the start step, a permit-to-join command is invoked on the input unit of the ZigBee router 114 to join the node to the ZigBee router 114 (step S501). Namely, the ZigBee router 114 is the target node.

When the new nodes (i.e., the ZigBee end device 118 and the ZigBee end device 128) not belonging to any PAN are powered on, they searches for the target node in their communication ranges by sending beacon request messages and receiving beacon response messages. Thus, in step S501, the ZigBee router 114 sends a beacon response message after it receives a beacon request message from the new node. Once the new node receives the beacon response message, it sends a join request message to the target node which sends the beacon response message (as shown in FIG. 6).

In order to avoid a situation that the ZigBee router 114 does not receive the join request message for a long time after the joined procedure thereof is started. In the present embodiment, a permit-to-be-joined timer is started after step S501 to count the time that the target node executes the joined procedure (step S503). Next, in step S505, whether the permit-to-be-joined timer reaches a predetermined permit-to-be-joined time limit is determined. The joined procedure is terminated if the permit-to-be-joined timer reaches the predetermined permit-to-be-joined time limit. For example, in the present embodiment, the predetermined permit-to-be-joined time limit is set to 30 seconds. In another embodiment of the disclosure, the joined procedure may also be cancelled by using an additional termination command, and in this case, the steps S503 and S505 are skipped.

Thereafter, in step S507, the target node determines whether to permit the join request message of the new node. For example, the ZigBee router 114 stores a not-permittedto-join address list. When the ZigBee router 114 receives the join request message, it determines whether the address of the new node which sends the join request message appears in the not-permitted-to join address list. If the address of the new node which sends the join request message appears in the not-permitted-to-join address list, the ZigBee router 114 does not permit the new node to join and the process returns to step S503.

If in step S507, the target node executes the message receiving step and permits the join request message of the new node, the target node sends a join response message to the new node. Then, in the prompt step, the indication unit of the target node issue a joined prompt (step S509). As shown in FIG. 6, when the ZigBee router 114 receives the join request message from the ZigBee end device 128, and the address of the ZigBee end device 128 does not appear in the not-permitted-to-join address list of the ZigBee router 114, the ZigBee router 114 sends a join response message to the ZigBee end device 128, and the LED of the ZigBee router 114 flashes. In addition, when the new node (for example, the ZigBee end device 128) receives the join response message, the indication unit of the new node issues a join prompt.

Next, in step S511, the target node starts a reject-to-be-joined timer to count the time since the target node sends the join response message. In step S513, whether the reject-to-be-joined timer reaches a predetermined reject-to-be-joined time limit is determined. For example, in the present embodiment, the predetermined reject-to-be-joined time limit is set to 10 seconds.

If the reject-to-be-joined timer has not yet reached the predetermined reject-to-be-joined time limit, whether the indication unit of the anticipated new node issues a join prompt is determined in the determination step (step S517). If in step S517, the indication unit of the anticipated new node does not issue the join prompt, in the reject step, a reject-to-be-joined command is invoked on the input unit of the target node to request the anticipated new node to leave the PAN (step S519). In step S521, the address of the new node which is requested to leave is added in the not-permitted-to-join address list so that the target node will not permit the new node which sends the join request message sent to join again. After that, the joined procedure returns to step S503.

Referring to FIG. 6, when the ZigBee end device 128 receives the join response message from the ZigBee router 114 and accordingly issues a join prompt, because the ZigBee end device 118 is the anticipated new node to join the PAN 110, a reject-to-be-joined command is invoked on the input unit of the ZigBee router 114 and a leave request message is sent to request the ZigBee end device 128 to leave the PAN 110. According to the ZigBee standard, when the ZigBee end device 128 receives the leave request message from the ZigBee router 114, it leaves the PAN 110 by sending a leave response message and cuts off the connection thereof with the ZigBee router 114.

If it is determined in step S513 that the reject-to-be-joined timer has reached the predetermined reject-to-be-joined time limit, in step S515, the permit-to-be-joined timer and the reject-to-be-joined timer are stopped and the joined procedure for the new node is completed.

Referring to FIG. 6, when step S507 is executed again, the ZigBee end device 118 sends a join request message to the ZigBee router 114, and the ZigBee router 114 permits the join request message of the ZigBee end device 118 and sends a join response message. Because the indication unit of the anticipated ZigBee end device 118 issues a join prompt and the reject-to-be-joined command is not invoked on the input unit of the ZigBee router 114, when the reject-to-be joined timer reaches the predetermined reject-to-be-joined time limit, the ZigBee end device 118 remains connecting to the ZigBee router 114.

Figure 7:
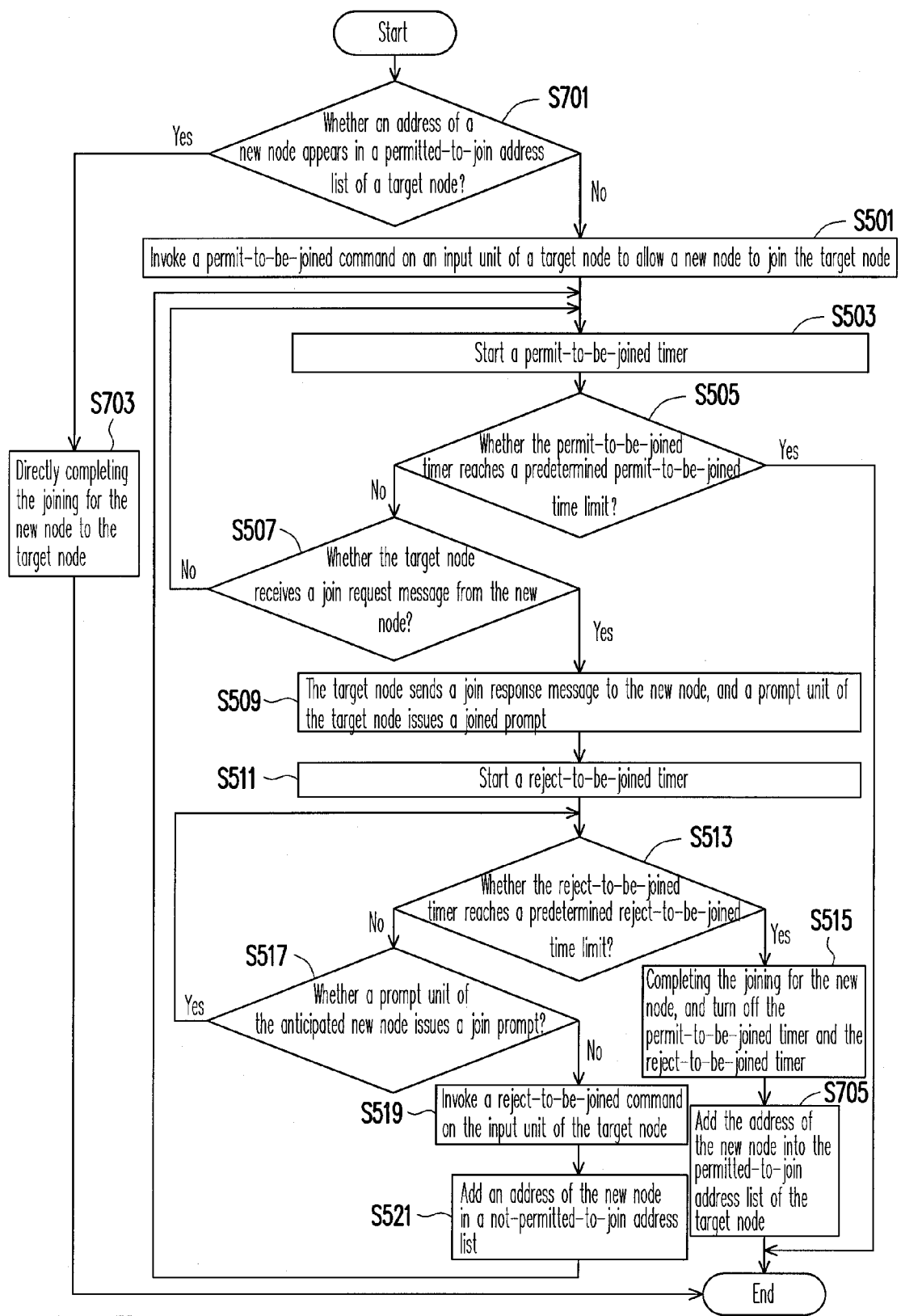
FIG. 7 is a flowchart of a joined procedure of a target node according to another embodiment of the disclosure.

In another embodiment of the disclosure, the target node stores a permitted-to-join address list for recording those successfully connected new nodes so that when next time a new node in the list is powered on, it can connect to the target node directly. FIG. 7 is a flowchart of a joined procedure of a target node according to another embodiment of the disclosure, wherein a step S701 is further executed to determine whether the address of the new node appears in the permitted-to-join address list of the target node. If the address of the new node appears in the permitted-to-join address list of the target node, the joining for the new node is completed directly in step S703. In addition, in the process illustrated in FIG. 7, a step S705 is further executed to add the address of the successfully connected new node into the permitted-to-join address list of the target node.

For example, as shown in FIG. 6, after the ZigBee end device 118 successfully connects to the ZigBee router 114, the address of the ZigBee end device 118 is added in the permitted-to-join address list of the ZigBee router 114.

How a target node accepts a new node has been described above. Below, how a new node connects to a target node will be described.

Figure 8:
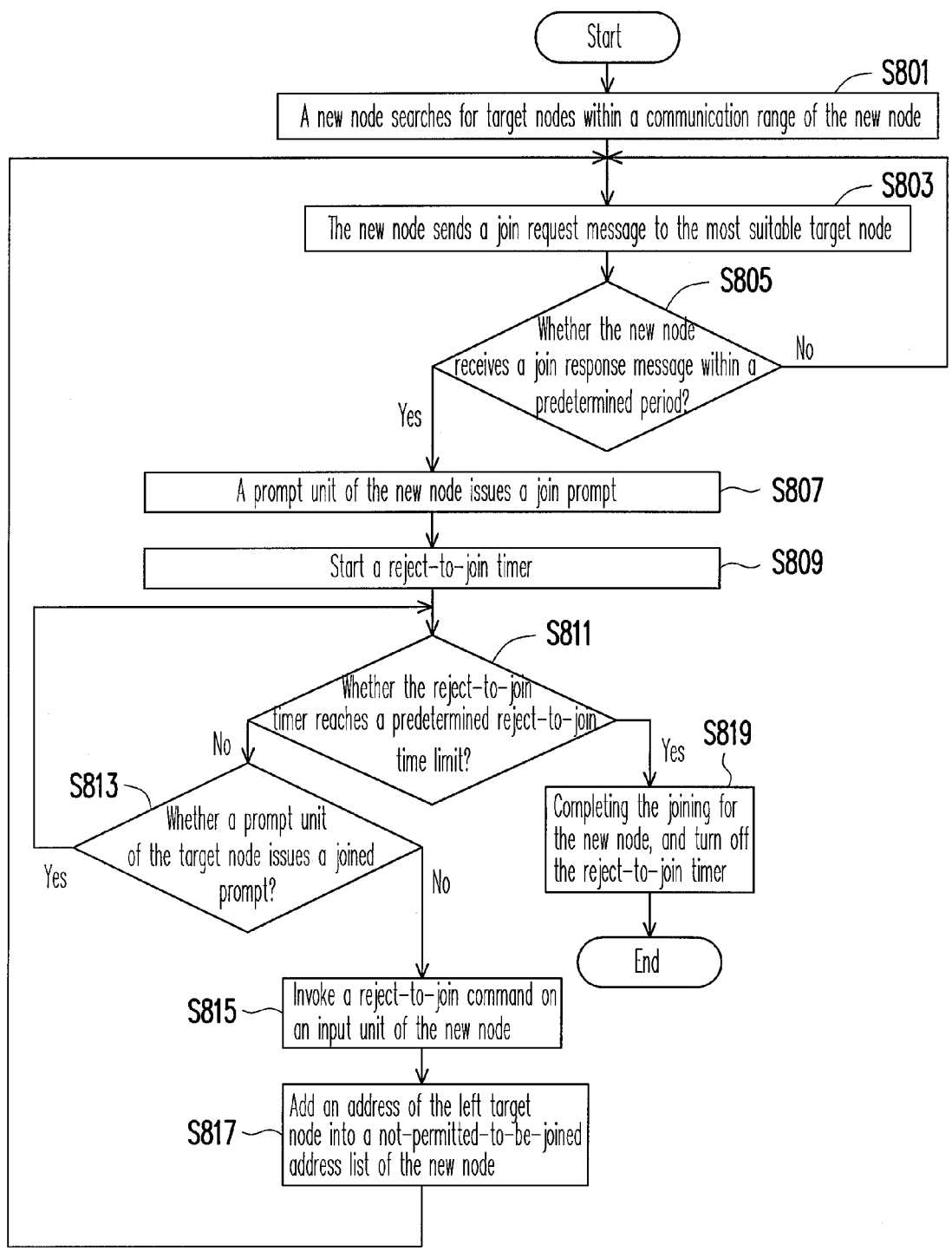
FIG. 8 is a flowchart illustrating how a new node connects to a target node according to an embodiment of the disclosure.
Figure 9:
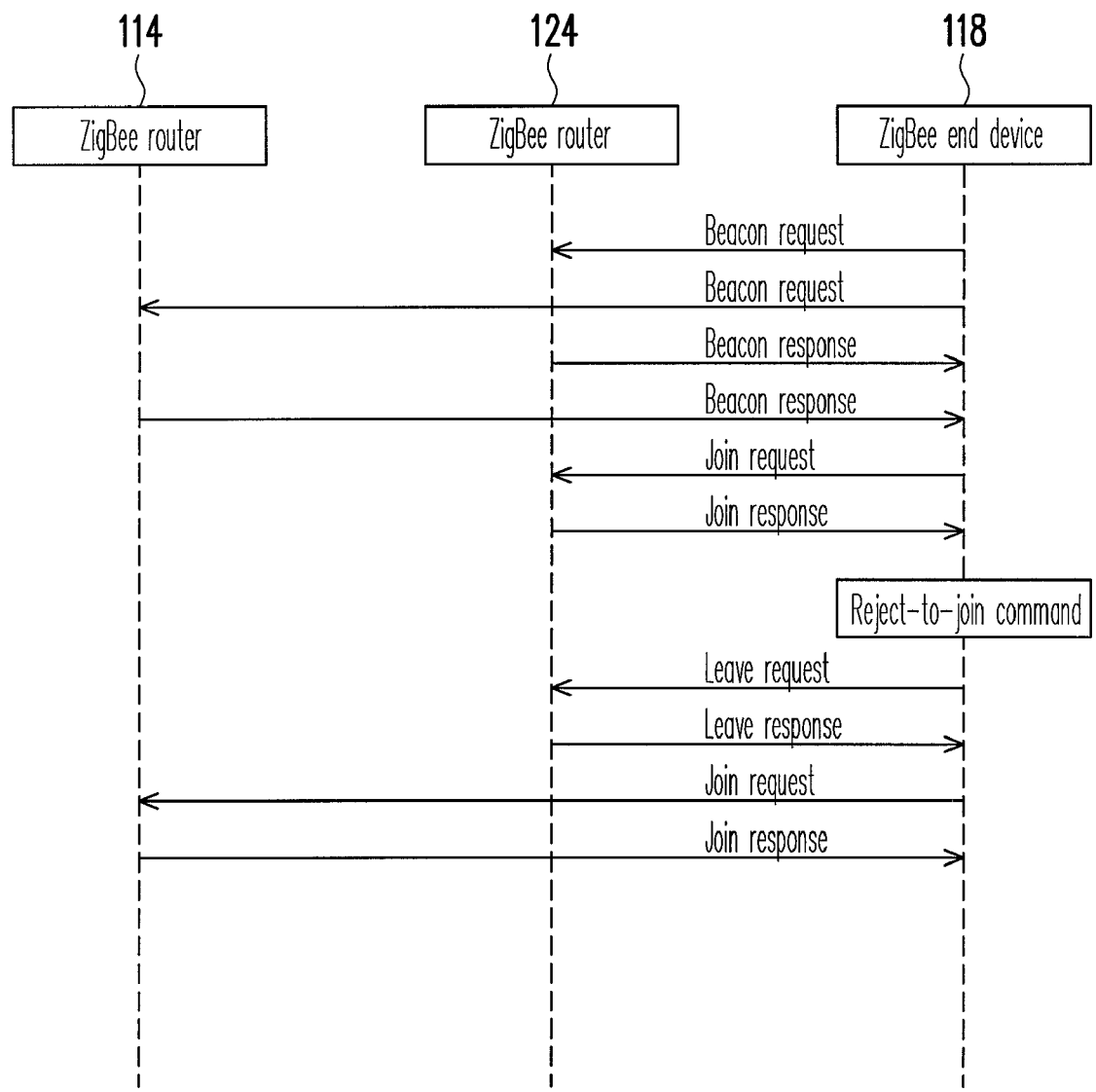
FIG. 9 is a diagram illustrating how a new node connects to a target node according to an embodiment of the disclosure.

FIG. 8 is a flowchart illustrating how a new node connects to a target node according to an embodiment of the disclosure, and FIG. 9 is a diagram illustrating how the ZigBee end device 118 connects to the ZigBee router 124 according to the present embodiment.

It is assumed that the network managers of the PAN 110 and the PAN 120 respectively start the joined procedures of the ZigBee router 114 and the ZigBee router 124 at the same time to connect a new node. Referring to FIGS. 3, 8, and 9, in step S801, the new node sends a beacon request message and receives one or more beacon response messages to search for the target node within the communication range thereof. For example, since the joined procedures of the ZigBee router 114 and the ZigBee router 124 have been started, the ZigBee router 114 and the ZigBee router 124 both send a beacon response message to the ZigBee end device 118.

Then, in step S803, the new node sends a join request message to the most suitable target node. For example, in an embodiment of the disclosure, the ZigBee end device 118 stores a not-permitted-to-be-joined address list such that the ZigBee end device 118 selects a target node which does not appear in the not-permitted-to-be-joined address list and has the strongest signal strength to send the join request message. As shown in FIG. 9, the ZigBee end device 118 first selects the ZigBee router 124 to send the join request message.

Thereafter, in step S805, whether the new node receives the join response message within a predetermined time (for example, 30 seconds) is determined. If it is determined in step S805 that the new node receives the join response message, in step S807, the indication unit of the new node issues a join prompt, and the ZigBee router 124 issues a joined prompt in the indication unit thereof. If it is determined in step S805 that the new node does not receive the join response message, the process returns to step S803.

Next, in step S809, a reject-to-join timer is started to count the time since the new node sends the join request message, and in step S811, whether the reject-to-join timer reaches a predetermined reject-to-join time limit is determined. For example, in the present embodiment, the predetermined reject-to-join time limit is set to 10 seconds.

Before the reject-to-join timer reaches the predetermined reject-to-be-joined time limit, in step S813, whether the indication unit of the anticipated target node issues a joined prompt is determined. If the indication unit of the anticipated target node does not issue the joined prompt in step S813, then in step S815, a reject-to-join command is invoked on the input unit of the new node to request the new node to leave the PAN, and the process returns to step S803. After that, in step S817, the address of the unanticipated target node is added in the not-permitted-to-be-joined address list thereof so that the new node will not send the join request message to the unanticipated target node again.

Referring to FIG. 9, when the ZigBee end device 118 receives the join response message from the ZigBee router 124, because the ZigBee router 114 is the target node to which the ZigBee end device 118 is about to connect, a reject-to-join command is invoked on the input unit of the ZigBee end device 118 so that the ZigBee end device 118 cuts off the connection thereof with the ZigBee router 124 and leaves the PAN 120 by sending a leave request message to the ZigBee router 124 and receiving a leave response message from the ZigBee router 124. In addition, the ZigBee end device 118 adds the address of the ZigBee router 124 in the not-permitted-to-be-joined address list thereof and then executes step S803 again.

If in step S811, the reject-to-join timer reaches the predetermined reject-to-join time limit, then in step S819, the reject-to-join timer is stopped and the join procedure for the new node is completed.

Referring to FIG. 9, when step S803 is executed again, the ZigBee end device 118 sends the join request message to the ZigBee router 114. After the ZigBee router 114 sends the join response message to the ZigBee end device 118, Because the indication unit of the ZigBee router 114 issues a joined prompt and the reject-to-join command is not invoked on the input unit of the ZigBee end device 118, when the reject-to-join timer reaches the predetermined reject-to-be-joined time limit, the ZigBee end device 118 remains connecting to the ZigBee router 114.

Figure 10:
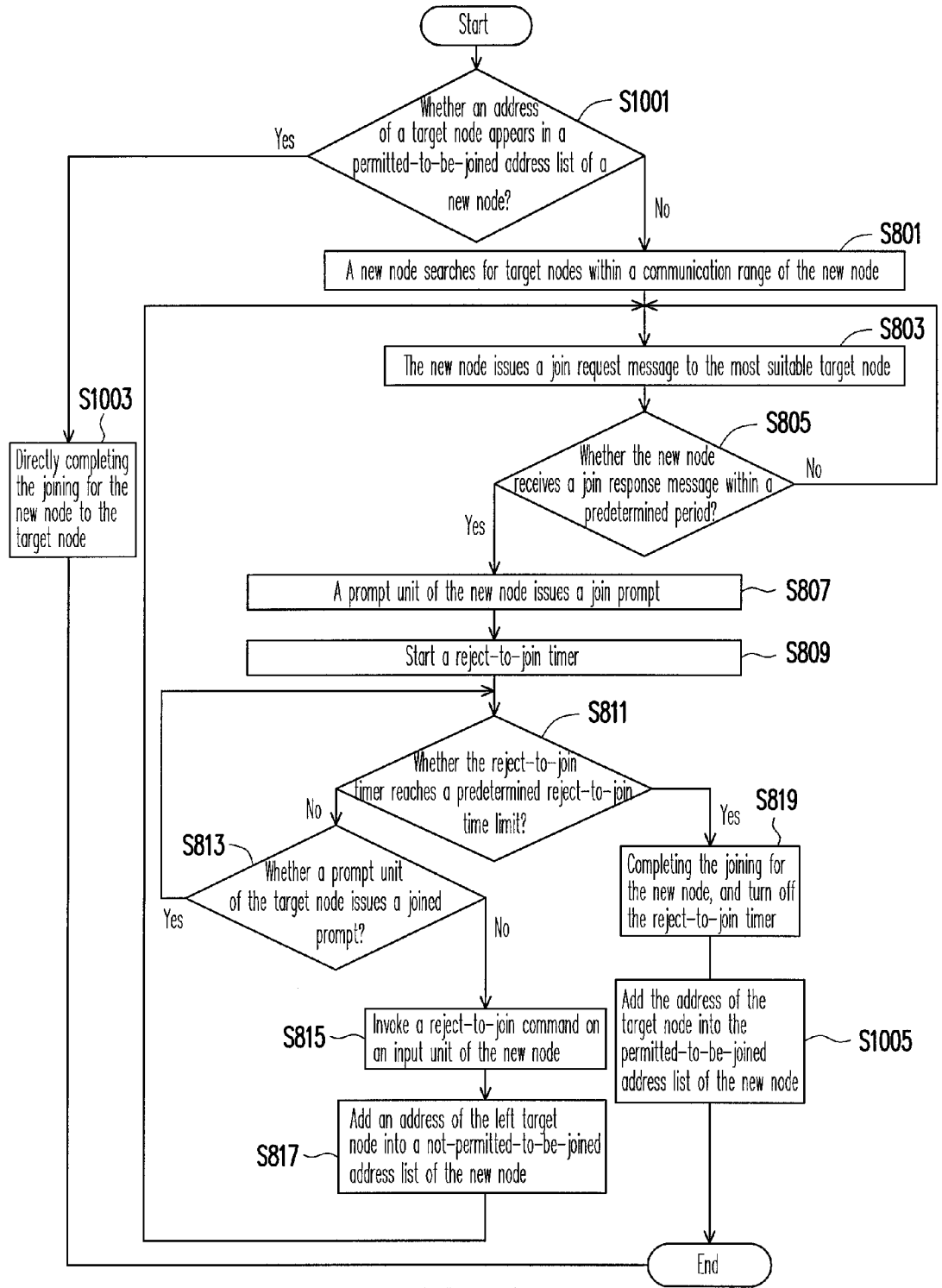
FIG. 10 is a flowchart illustrating how a new node connects to a target node according to another embodiment of the disclosure.

It should be mentioned that in another embodiment of the disclosure, the new node stores a permitted-to-be-joined address list for recording those successfully connected target node so that when next time the new node is started, it can directly connect to target nodes that appear in the permitted-to-be-joined address list. FIG. 10 is a flowchart illustrating how a new node connects to a target node according to another embodiment of the disclosure, wherein a step S1001 is further executed to determine whether the address of the target node appears in the permitted-to-be-joined address list of the new node. If the address of the target node appears in the permitted-to-be-joined address list of the new node, in step S1003, the joining for the new node is completed directly. In addition, in the process illustrated in FIG. 10, a step S1005 is further executed to add the successfully connected target node into the permitted-to-be-joined address list of the new node.

In the embodiment illustrated in FIG. 9, after the ZigBee end device 118 successfully connects to the ZigBee router 114, the address of the ZigBee router 114 is added into the permitted-to-be-joined address list of the ZigBee end device 118.

It should be noted that in an embodiment of the disclosure, the not-permitted-to-join address list and the permitted-to-join address list created in a target node and the not-permitted-to-be-joined address list and the permitted-to-be-joined address list created in a new node can be cleared by using foregoing input units. For example, when a network manager is about to clear a first record in the not-permitted-to-join address list of the ZigBee router 114, the network manger presses down the input unit (i.e., a button) of the ZigBee router 114 for 5 seconds and then releases it, and then the network manager presses the input unit once. When the network manger is about to clear a second record in the not-permitted-to-join address list of the ZigBee router 114, the network manager presses down the input unit of the ZigBee router 114 for 5 seconds and then releases it, and then the network manager presses the input unit twice.

It should be mentioned that in the embodiment described above, whether the join procedure is correct is determined after the new node (for example, the ZigBee end device 118) joins the target node (for example, the ZigBee router 114), and if the join procedure is not correct, the reject-to-join command or reject-to-be-joined command is invoked to terminate the join procedure. However, in another embodiment of the disclosure, whether an unanticipated connection occurs may be determined even before the new node joins the target node. For example, after the permit-to-join command is invoked on the input unit of the target node, the target node receives a join test request message from the new node and responds the new node with a join test response message. Then, the indication unit of the target node issues a prompt, and at the same time, the indication unit of the new node which receives the join test response message also issues a prompt correspondingly. In the present embodiment, the new node sends the join request message and the target node responses the join response message only when both the target node and the new node issue the prompts. If the target node does not issue any prompt, a reject-to-be-joined command is invoked on the target node, and a join test reject message is sent to the new node to terminate the joined test procedure; and if the new node does not issue any prompt, a reject-to-join command is invoked on the new node, and a join test reject message is issued to the target node to terminate the join test procedure.

As described above, in the disclosure, whether a new node and a target node are correctly connected is determined by comparing the indication units of the new node and the target node, and when the new node and the target node are not correctly connected, a reject-to-join command or a reject-to-be-joined command is invoked to terminate the inappropriate connection between the new node and the target node. Accordingly, unanticipated connection is prevented in the wireless ad-hoc network. Moreover, since the unanticipated connection is determined and prevented through simple reject-to-join commands and join and joined prompts, the method in the disclosure can be applied to ZigBee nodes with limited hardware or software resources.

Furthermore, it should be understood that the steps described in foregoing embodiments are not intended for limiting the scope of the disclosure, and those skilled in the art should be able to adopt other execution sequence of those steps or omit some of the steps without departing the spirit and scope of the disclosure.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A method for a node to join a wireless ad-hoc network, comprising:

invoking a permit-to-join command on an input unit of a target node to start a joined procedure of the target node;

sending a join request message by a new node to start the join procedure of the new node;

starting a permit-to-be-joined timer;

determining whether the permit-to-be-joined timer reaches a predetermined permit-to-be-joined time limit, and terminating the joined procedure of the target node if the permit-to-be-joined timer reaches the predetermined permit-to-be-joined time limit;

sending a join response message by the target node and issuing a joined prompt on an indication unit of the target node, wherein when the new node receives the join response message, an indication unit of the new node issues a join prompt;

determining whether the joined prompt of the target node and the join prompt of the new node are correspondingly issued; and if the joined prompt of the target node and the join prompt of the new node are not correspondingly issued, a reject-to-be-joined command is invoked on the input unit of the target node issuing the joined prompt to cancel the joined procedure of the target node, or a reject-to-join command is invoked on an input unit of the new node issuing the join prompt to cancel the join procedure of the new node.

2. A method for a node to join a wireless ad-hoc network, suitable for connecting a new node among a plurality of candidate new nodes to a target node in a target wireless ad-hoc network, wherein the candidate new nodes and the target node respectively equipped with an input unit and an indication unit, the method for joining the new node to the wireless ad-hoc network comprising:

(a) receiving a permit-to-join command from the input unit of the target node to start a joined procedure of the target node, starting a permit-to-be-joined timer, determining whether the permit-to-be-joined timer reaches a predetermined permit-to-be-joined time limit; and terminating the joined procedure if the permit-to-be-joined timer reaches the predetermined permit-to-be-joined time limit;

(b) receiving a join request message from one of the candidate new nodes by the target node during the joined procedure;

(c) sending a join response message from the target node which receives the join request message to said one of the candidate new nodes during the joined procedure, and issuing a joined prompt on the indication unit of the target node, wherein when said one of the candidate new nodes receives the join response message, the indication unit of this candidate new node issues a join prompt;

(d) determining whether the joined prompt of the target node and the join prompt of the new node are correspondingly issued during the step (c); and (e) invoking a reject-to-be-joined command from the input unit of the target node if the joined prompt of the target node and the join prompt of the new node are not correspondingly issued during the step (d).

3. The method according to claim 2 further comprising creating a not-permitted-to-join address list on the target node.

4. The method according to claim 3, wherein in the step (c), the target node sends the join response message to said one of the candidate new nodes only when said one of the candidate new nodes is not in the not-permitted-to-join address list of the target node.

5. The method according to claim 3, wherein after the step (e), the method further comprises:

adding the address of said one of the candidate new node to the not-permitted-to-join address list.

6. The method according to claim 5 further comprising deleting the addresses from the not-permitted-to-join address list by using the input unit of the target node.

7. The method according to claim 2 further comprising creating a permitted-to-join address list on the target node.

8. The method according to claim 7 further comprising:

determining whether the addresses of the candidate new nodes appear in the permitted-to-join address list, wherein the candidate new nodes are allowed to join the target node if the addresses of the candidate new nodes appear in the permitted-to-join address list.

9. The method according to claim 8 further comprising deleting addresses from the permitted-to-join address list by using the input unit of the target node.

10. The method according to claim 2 further comprising measuring signal quality of the candidate new nodes on the target node, and sending the join response message to one of the candidate new nodes according to the measured signal quality.

11. The method according to claim 2 further comprising determining whether an unanticipated connection occurs before the new node joins the target node.

12. A method for a node to join a wireless ad-hoc network, suitable for a new node to join a target node among a plurality of candidate target nodes, wherein a joined procedure of the target node is started, and the new node and the candidate target nodes respectively equipped with an input unit and a indication unit, the method comprising:

(a) starting a permit-to-be-joined timer;

(b) determining whether the permit-to-be-joined timer reaches a predetermined permit-to-be-joined time limit, and terminating the joined procedure of the target node if the permit-to-be-joined timer reaches the predetermined permit-to-be-joined time limit;

(c) sending a join request message from the new node to one of candidate target nodes during the joined procedure;

(d) receiving a join response message from said one of the candidate target nodes by the new node and issuing a join prompt on the indication unit of the new node during the joined procedure, wherein the indication unit of said one of the candidate target nodes issues a joined prompt after said one of the candidate target node issues the join response message;

(e) determining whether the joined prompt of the target node and the join prompt of the new node are correspondingly issued during the joined procedure; and (f) receiving a reject-to-join command from the input unit of the new node during the joined procedure if the joined prompt of the target node and the join prompt of the new node are not correspondingly issued.

13. The method according to claim 12 further comprising creating a not-permitted-to-be-joined address list on the new node.

14. The method according to claim 13, wherein in the step (c), the address of said one of the candidate target nodes does not appear in the not-permitted-to-be-joined address list.

15. The method according to claim 13, wherein the step (f) further comprises:

adding the address of said one of the candidate target nodes to the not-permitted-to-be-joined address list.

16. The method according to claim 15 further comprising deleting addresses in the not-permitted-to-be-joined address list by using the input unit of the new node.

17. The method according to claim 12 further comprising creating a permitted-to-be-joined address list on the new node.

18. The method according to claim 17 further comprising: determining whether the addresses of the candidate target nodes appear in the permitted-to-be-joined address list, wherein the new node is allowed to join the candidate target nodes if the addresses of the candidate target nodes appear in the permitted-to-be-joined address list.

19. The method according to claim 18 further comprising deleting an address in the permitted-to-be-joined address list by using the input unit of the new node.

20. The method according to claim 12 further comprising measuring signal quality of the candidate target nodes on the new node, and issuing the join request message to one of the candidate target nodes according to the measured signal quality.

21. The method according to claim 12 further comprising determining whether an unanticipated connection occurs before the new node joins the target node.

22. A wireless ad-hoc network system, suitable for a wireless ad-hoc network, the wireless ad-hoc network system comprising:
a target node, already joined a target wireless ad-hoc network and equipped with a first input unit and a first indication unit, wherein the first input unit is used for receiving a permit-to-join command to start a joined procedure on the target node; and
a new node, equipped with a second input unit and a second indication unit, wherein the new node automatically sends a join request message to start the join procedure on the new node,
wherein the target node starts a permit-to-be-joined timer and determines whether the permit-to-be-joined timer reaches a predetermined permit-to-be-joined time limit,
wherein the target node terminates the joined procedure of the target node if the permit-to-be-joined timer reaches the predetermined permit-to-be-joined time limit,
wherein when the target node sends a join response message, the first indication unit issues a joined prompt, and when the new node receives the join response message, the second indication unit issues a join prompt,
wherein if the joined prompt on the first indication unit and the join prompt on the second indication unit are not correspondingly issued during the join procedure, the first input unit or the second input unit is further used for receiving the reject-to-join command to cancel the joined procedure on the target node or the join procedure on the new node.

23. The wireless ad-hoc network system according to claim 22, wherein the target wireless ad-hoc network is a network conforming to a ZigBee standard.

24. The wireless ad-hoc network system according to claim 23, wherein the target node is a ZigBee coordinator or a ZigBee router.

25. The wireless ad-hoc network system according to claim 23, wherein the new node is a ZigBee router or a ZigBee end device.

26. The wireless ad-hoc network system according to claim 23, wherein the first input unit and the second input unit respectively comprise a button or a graphic user interface (GUI).

27. The wireless ad-hoc network system according to claim 23, wherein the first indication unit and the second indication unit respectively comprise a sound producing device, a light emitting diode (LED) light, or a liquid crystal display (LCD).

* * * * *